Nov. 4, 1969 — F. BUFF ET AL — 3,476,845

MANUFACTURE OF EXPANDED CELLULAR PRODUCTS

Original Filed Oct. 2, 1964 — 2 Sheets-Sheet 1

INVENTORS
FRED BUFF
MARCUS FRENCH
WARREN POLLOCK
BY Ward, Haselton, McElhannon,
Orme, Brooks & Fitzpatrick
ATTORNEYS

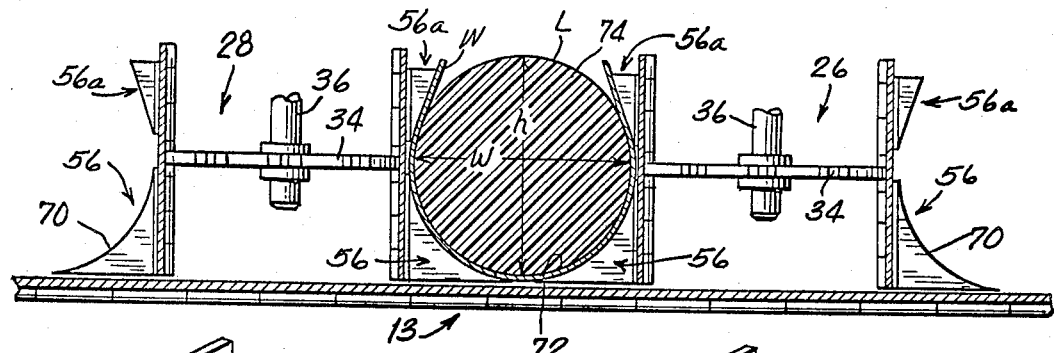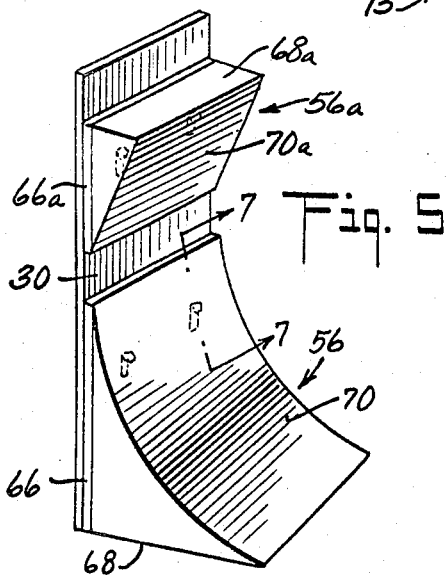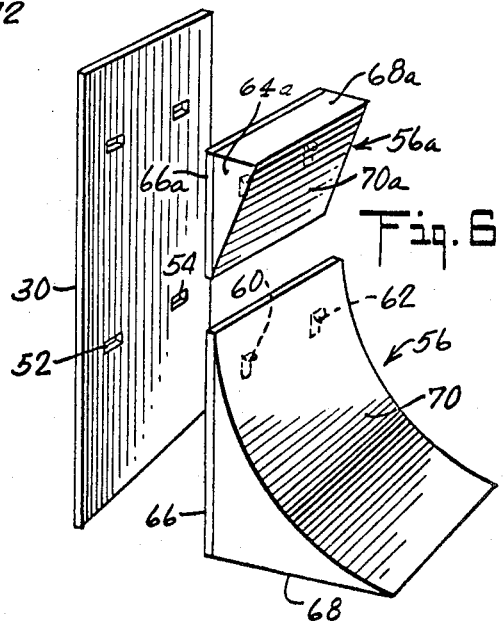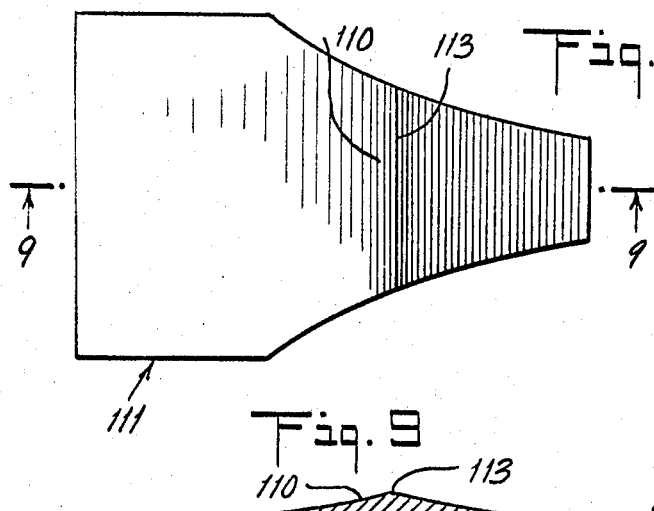

United States Patent Office 3,476,845
Patented Nov. 4, 1969

3,476,845
MANUFACTURE OF EXPANDED CELLULAR
PRODUCTS
Fred Buff, 59 Wyoming Road, Paramus, N.J. 07652;
Marcus French, 160 S. Church St., Hazelton, Pa.
18201; and Warren Pollock, Orchard Lane, Conyngham, Pa. 18219
Original application Oct. 2, 1964, Ser. No. 401,190, now
Patent No. 3,281,894, dated Nov. 1, 1966. Divided
and this application Nov. 15, 1965, Ser. No. 525,782
Int. Cl. B29d 27/04; B29h 7/20
U.S. Cl. 264—54
9 Claims

ABSTRACT OF THE DISCLOSURE

A process is described for the continuous preparation of cylindrical elements of flexible polyurethane foam in which the liquid reaction mixture is deposited on a casting surface which is moving longitudinally away from the deposit station and is maintained in a cylindrical open top configuration during the foam rise period while the foam assumes the desired shape.

---

This is a division of our application Ser. No. 401,190, filed Oct. 2, 1964, now Patent No. 3,281,894, which in turn is a continuation-in-part of our application Ser. No. 333,479, filed Dec. 26, 1963, now Patent No. 3,296,658.

The present invention relates to the manufacture of expanded cellular products and, more particularly, to novel and improved methods and means for forming continuous, contoured lengths of expanded plastic cellular foam material.

It is the general practice, in the manufacture of expanded cellular products, such as, polyurethane foam, from a liquid reaction mixture, to employ, at a pouring station, a distributing or foaming head or nozzle mounted for travel back and forth across the width of a traveling casting surface. Generally, this casting surface comprises an endless conveyor onto which the liquid reaction mixture is deposited. The mixture reacts and sets in its expanded state as it is supported by and advanced away from the deposit or casting station on the casting conveyor.

As an example, polyurethane foams may be prepared by reaction between polyethers, or equivalent polymeric reactant polyesters having a plurality of hydroxyl groups or other active hydrogen containing group in the molecule and a diisocyanate, such as, tolylene diisocyanate or 4,4'-diphenylmethane diisocyanate. The reaction may be catalyzed by the presence of, for example, a tertiary amine catalyst, such as triethylamine, trimethylamine or N-methylmorpholine. Trhe foams are resilient, cellular structures and are used extensively in the production of many useful products. In many uses, they are favored over other foam materials, such as rubber, because of their improved load bearing capacity as well as abrasion and flame resistance.

The reaction mixture for forming the foam material is cast or deposited as a highly flowable liquid, which readily "runs" or assumes the shape of the surface upon which it is deposited, and starts to foam and rise from the casting surface almost immediately upon moving away from the casting station.

Since the material is highly fluid, most casting conveyors are provided with cooperating stationary side wall elements to form a three-sided, open-top enclosure for the deposited reaction mixture. Heretofore, these cooperating side wall elements have been generally planar and at right angles to the plane of the conveyor. With this arrangement, the cellular product or "slab" or "bun" formed by the reaction mixture has a generally rectangular lower portion. The upper unrestrained top surface of the foam material assumes a natural curved or arcuate configuration—a phenomenon of the reaction forming the product. Inevitably, the products so produced have all exhibited a rectangular lower portion and a curved top surface. This particular configuration has resulted in substantial waste when the relatively-thick slab was subjected to further operations to produce relatively thin, sheets which have more commercial application or when shapes other than those having a rectangular bottom were sought.

Generally, the thick slabs as cast are continuous and can be of any given length. Usually the width of the slab may be from 2 to 7 feet, and the slab length up to 9 feet. Obviously, such a massive foam slab must be further handled to produce sizes thereof suitable for commercial application.

To produce these smaller sizes, the slab is "peeled," that is, a longitudinally-extending, axial hole is bored through the slab and a support rod inserted therethrough. The slab is then rotated on its support rod as the slab is brought into contact with a moving cutter element, such as a knife blade, to produce a thinner continuous sheet of foam material from the slab. The rectangular-bottom slab, when subjected to the peeling operation, results in substantial waste due to its lower, rectangular configuration, which cannot be readily accommodated by the peeling process. This waste is approximately 28 percent by volume of the foam slab.

Likewise, when contoured shapes were desired, it was necessary to form these shapes, as by cutting from a large rectangular-bottomed slab. This process again resulted in substantial waste.

The commercial production of polyurethane foam commenced in approximately 1954. Since that time, it has been common practice in the manufacture of polyurethane foam, to employ at a pouring station a nozzle mounted for travel back and forth across the width of a traveling casting surface. The traveling casting surface functioned as the moving bottom wall of the enclosure for forming the polyurethane foam into rectangular slabs or buns. In order to retain the foam mass and to provide the contemplated bun with straight side walls, the movable bottom wall had positioned at right angles thereto stationary side walls.

The peeling referred to above started commercially in approximately 1959 and, as stated, has resulted in a waste of approximately 28 percent by volume of the foam slab. Due to this tremendous loss, there has been a concentrated effort by foam manufacturers to devise a method for manufacturing foam which would have a generally circular cross-section as contrasted to a generally rectangular cross-section. One of the methods attempted in order to produce a generally circular cross-section foam bun, was to make the side walls rounded or semi-circular. This was done so that the stationary side walls would confine the expanding foam into a generally circular cross-section. This effort proved unsuccessful, however, since it resulted in internal flaws and cracks due to the stresses set up by the foam mixture sliding along the fixed sidewall portions. One of the reasons for this was that in order to provide a bun of circular cross-section it was necessary to reduce the width of the movable bottom wall, i.e. the driving area. When the driving area or width of the bottom wall was reduced, it resulted in additional drag area on the stationary walls, which resulted in cracks, splits and shearing in the foam bun.

The present invention is characterized by the employment of novel method and apparatus for forming a novel, continuous, contoured slab, having a generally circular cross-section. The novel shaped slab is achieved by employing a pair of spaced vertically driven side conveyors cooperating in timed synchronism with the lowermost casting conveyor for advancing the foaming reaction products away from the deposit station. To achieve the novel contoured slab, the bottoms of the side conveyors are each provided with a plurality of preferably removable slab support elements. The slab support elements of the opposed conveyors are formed with cooperating contour surfaces. In the preferred embodiment, each contour support element is formed with a support surface that is quarter-cylindrical. Thus, each opposed element forms in contiguous traveling disposition a semicylindrical or rounded slab bottom.

By segmentally supporting the foam material on a plurality of contoured support elements, the bottom of the highly fluid reaction mixture assumes the rounded shape thereof. As the foam material is advanced away from the deposit station, it rises in the conventional manner with the head continuing to deposit reaction materials on the support elements successively delivered by the side conveyors to the deposit station. However, the lowermost portion of the continuously formed slab in contact with the contoured support elements is formed with a rounded or contoured configuration.

As stated above, the unrestrained top of the foam slab normally assumes a curved or arcuate configuration, this being a phenomenon of the reaction forming the product. In order to form the top of the foam slab into a circular cross-section the top of each side conveyor is provided with surfaces that will direct the rising foam so that it will assume a generally cylindrical top.

The novel, generally cylindrical slab shape so produced, when subjected to the peeling process described hereinabove, can be cut into the smaller sheet stock with virtually little or no waste because of slab shape.

However, in its broadest sense, the novel shaped slab is achieved by employing a casting conveyor having a contoured or shaped section corresponding to the desired shape. The section is adapted to move with the foam from the casting station until the foam slab has at least assumed its final integrity and self-sustained shape. In this manner, a contoured slab can be readily realized.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention, and wherein like numerals designate like parts:

FIG. 4 is a sectional front view taken along line 4—4, FIG. 1;

FIG. 5 is a detailed perspective view of one of the novel contoured slab support elements;

FIG. 6 is an exploded view of the support element of FIG. 5;

FIG. 8 is an exploded plan view of the weir illustrated in position in FIG. 1, and FIG. 9 is a sectional front view of the weir illustrated in FIG. 1.

Figure 1:
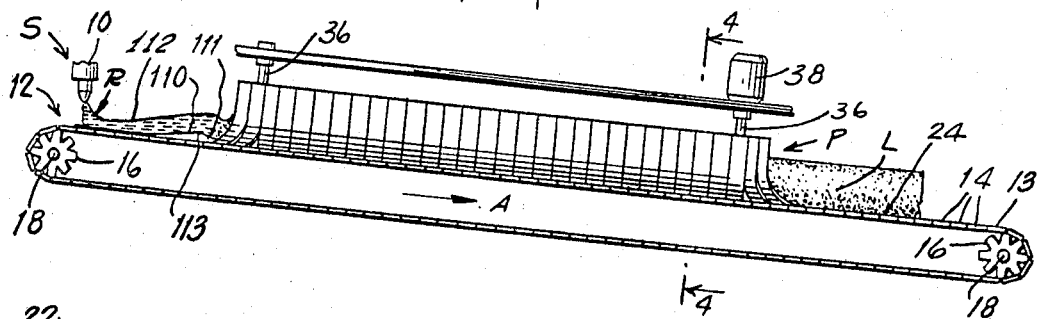
FIG. 1 is a side elevation illustrating somewhat schematically mechanism embodying a form of the present invention.
Figure 2:
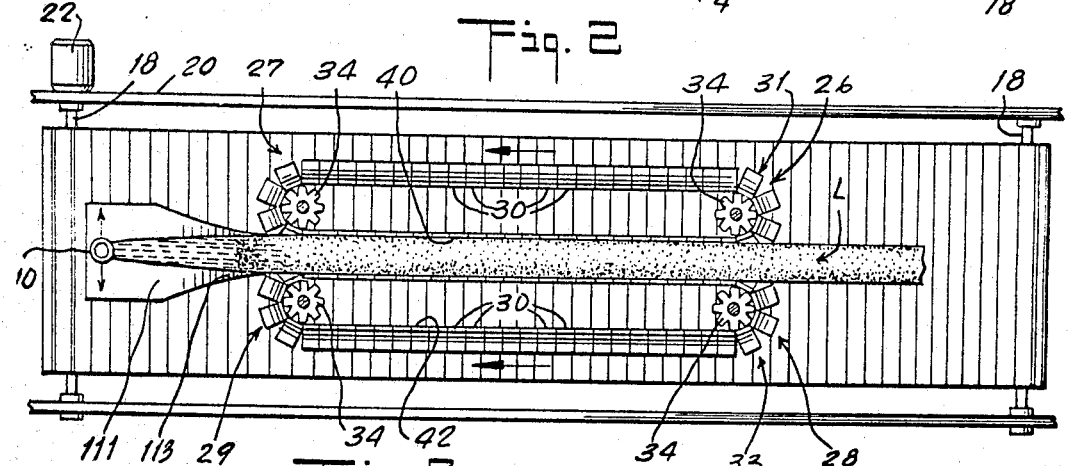
FIG. 2 is a plan view of the mechanism of FIG. 1.
Figure 3:
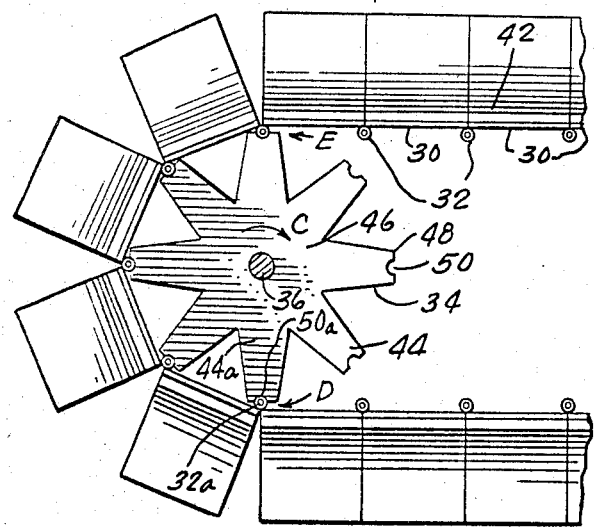
FIG. 3 is a detailed plan view of a portion of the support and drive mechanism of one of the side conveyors of FIG. 1.

Turning to the drawings which illustrate a form of the present invention, and particularly to FIGS. 1–3 the foam reaction liquid R is distributed at the deposit or casting station S from a distributing head, designated generally 10, onto a movable receiving surface 12. Head 10 can be mounted for reciprocal travel in the direction of the arrows (FIG. 2) transverse to the direction of travel of surface 12 to provide uniform distribution of the reaction liquid R onto surface 12.

Surface 12 is preferably part of an endless conveyor 13 formed of a plurality of pivotally interconnected metallic bars 14. In the form of conveyor, illustrated schematically in FIG. 1, the ends of the conveyor 13 are trained around spaced spiders 16. The spiders 16 are shown fixed to and rotatable with associated axial support shafts 18, in turn, supported in suitable bearing on framework 20 and driven by motor 22. As shown in FIG. 1, the conveyor support elements can be vertically spaced as well as horizontally to provide a readily variable slight downward grade or incline to the conveyor in its direction of travel, arrow A, FIG. 1, past station S. Thus, conveyor 13 is mounted for travel to and away from station S for deposit of liquid R onto its uppermost stretch passing directly beneath head 10 in the direction of arrow A.

Cooperating with conveyor 13 to contain the foam material therebetween are a pair of spaced side endless conveyors 26 and 28. Each of the side conveyors 26 and 28 is also formed with a plurality of contiguous metallic bars 30. Adjacent bars 30, in turn, are each pivotally connected to an intermediate rod 32 (see FIG. 3). The conveyors 26 and 28 are trained at each end about associated spiders 34, each of which is supported on and rotatable with a related axial shaft 36. One of the shafts 36 for each conveyor is connected to a suitable power source, such as motor 38, and both the motors 38 and shafts 36 are suitably mounted on a portion of the machine framework 20.

In operation, conveyors 26 and 28 are mounted for relative movement toward or away from each other to vary, as desired, the foam slab width. Likewise, one end 27 and 29, respectively, of conveyors 26 and 28 is located adjacent the deposit station S while the other end 31 and 33 of conveyors 26 and 28, respectively, are located at a point P along the path of travel of conveyor 13 remote from station S. At point P the foam reaction has been completed, and the slab L thus formed has assumed its final integrity and self-sustaining shape and, accordingly, is released by side conveyors 26 and 28.

To travel conveyors 26 and 28 back and forth between deposit station S and release point or station P, conveyors 26 and 28 are trained about spiders 34 as described hereinabove which, when connected to their driving source, rotate in their respective directions shown by the arrows thereon in FIG. 2, to travel laps 40 and 42 of conveyors 26 and 28 in opposed, foam slab-supporting arrangement from station S to station P.

Spiders 34 are formed with a plurality of arms 44 extending radially outwardly from a central section 46. The tip 48 of each arm 44 is provided with a recess 50 therein which accommodates a rod 32 supporting two adjacent bars 30. As shown best in FIG. 3, spider 34, which shows the end 29 of conveyor 28 by way of example, is rotated, as in the direction of arrow C, FIG. 3, such that an arm 44a thereof engages an associated rod 32a at point D in its end recess 50a. As spider 34 is rotated from its power source (not shown), rod 32a travels in its spider arm 44a to a point E where it is released by this particular spider 34 for travel along lap or stretch 42 in slab-supporting disposition.

It will be understood that, if desired, conveyor 13 may be supported and driven in similar fashion or other forms of support and drive for conveyors 13, 26 and 28 may be readily employed without adverse effect.

Preferably, conveyors 13, 26 and 28 are driven by their respective drive systems in timed synchronism at exactly the same speed. Thus, during the foam rise between stations S and P, no highly undesirable external stress is developed by slab L from misalignment or jarring, as would occur if there were a speed differential transverse across the slab cross-section.

Suitable apparatus, including support and drive mechanism for conveyors 13, 26 and 28, except as herein modified below, is commercially available from M–H Standard Corporation, 400 Heaton St., Hamilton, Ohio, and further disclosure thereof is omitted in the interests of brevity.

Figure 7:
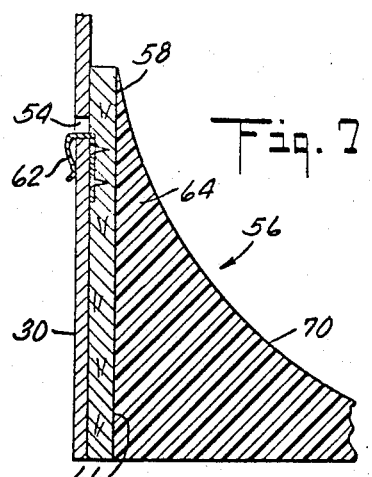
FIG. 7 is a sectional view of the support element taken along line 7—7, FIG. 5.

To achieve the novel contoured slab which preferably is formed as a continuous, generally cylindrical body, the bars 30 of each conveyor 26 and 28 have formed therein a pair of spaced slots 52 and 54, which releasably accommodate contoured slab-support elements 56 and 56a (see FIGS. 5–7).

Elements 56 and 56a include a rigid base member 58 of wood, plastic, metal or other suitable rigid material into which are fixed a pair of spring-like retaining slips 60 and 62. Clips 60 and 62 are accommodated in slots 52 and 54, respectively, as shown best in FIG. 7, to releasably connect support element 56 and its associated travel bar 30 with base 58 of the support element 56 contiguous to its bar 30.

Element 56 also includes a three-sided, wedge-shaped contour piece 64, having a pair of transverse legs 66 and 68 and an arcuate third side or face 70. Contour piece 64 is adhered or otherwise suitably attached to base 58 along leg 66 with leg 68 thereof positioned closely adjacent or in contact with the upper stretch 24 of conveyor 13 (see FIG. 4). Thus, arcuate face 70 is the slab-supporting portion of contour piece 64. As will be noted, face 70 is preferably quarter-cylindrical and when in operative slab-supporting position shown in FIG. 4, opposed elements 56 have cooperating faces 70 to form a continuous, semicylindrical bottom support for the slab L being formed.

The element 56a also includes a three sided triangular or wedge-shaped piece 64a having a pair of transverse legs 66a and 68a and a hypotenuse or third side or face 70a. The piece 64a is adhered or otherwise suitably attached to base 58 along leg 66a with the leg 68a positioned a slight distance below the top of the support 30. The purpose of the triangular piece 56a is to direct the rise of the foam so the top of the foam slab is rounded or cylindrical in cross-section, the face 70a being the slab-supporting portion of the piece 64a.

In order to obtain a foam slab approximately thirty (30) inches in diameter the following dimensions of the various parts have been found to be the best.

| Element: | Six (inches) |
| --- | --- |
| 68 | 12 |
| 66 | 15 |
| 70 (radius) | 15 |
| 66a | 8 |
| 68a | 3.75 |
| 30 | 29.5 |

It has been found that a highly suitable material for wedge-shaped piece 64 and triangular shaped piece 64a is flexible urethane foam, which can be quickly and inexpensively contoured to the desired shape and, in addition, has the capacity to absorb any detrimental jarring that will occur to the slab L as it is in the process of being formed by the reaction materials. However, other materials, such as wood or a rigid polystyrene foam and other fabricated or cast products of various kinds could also be employed for this purpose.

In operation, the preferred relative spacing of conveyors 26 and 28 is made by the machine operator, and the desired angle of inclination of conveyor 13 is set. Contour pieces 64 and 64a with the proper contour faces 70 and 70a are attached to their associated conveyors 26 and 28 and the speeds of conveyors 13, 26 and 28 synchronized.

Next, a web of highly non-adhering release paper W is fed past the deposit station S between laps 40 and 42 of conveyors 26 and 28, and onto the cooperating contour faces 70 of the opposed pieces 64.

Release paper W is utilized to prevent adhesion of the foam material, due to its elastomeric nature, to the surfaces of the conveyors. While a silicone or polyfluoroethylene coating of the portions of the conveyors in contact with the foam material might suffice, it has been found that release paper operates the most satisfactorily for this purpose. It will, of course, be understood that the release paper W also assumes the rounded shape of contour pieces 70 (see FIG. 4).

With the conveyors 13, 26 and 28 properly set and running, and release paper W in place thereon, distributing head 10 is started to deposit liquid reaction material R onto the release paper W and the cooperating faces 70 of the side conveyors 26 and 28, which conduct the now-foaming reaction material away from deposit station S.

When the reaction has been completed and the slab L assumes its integral size upon completion of the foam reaction, the support contour elements 56 are moved out of supporting position around their associated spiders 34 at release station P and the formed slab L on conveyor 13 continues its travel to a suitable cutting station (not shown) and thence to a remote peeling station (not shown).

In the manufacture of plastic foam slabs the liquid foam commences to foam or react within a short distance after leaving the discharge nozzle 10. This reaction or foaming point is called the cream line.

It has been found that in the manufacture of foam slabs utilizing a moving bottom wall 13 and moving side walls 26 and 28 that the cream line 110 is in the form of a V, i.e., the liquid foam flows to the center. This results in top cracks in the foam slab. In order to prevent this from occurring, it is necessary to create a cream line 110 that is perpendicular to the path of travel of the conveyor 13 as indicated by the arrow in FIG. 1. This is accomplished by providing a weir 111 just prior to the cream line. This creates a liquid pool or reservoir 112 of liquid foam. As the foam starts to react at the cream line 110 the foam spills over the edge 113 of the weir 111. In this manner the location and geometrical configuration of the cream line is controlled, which results in foam slabs that are relatively free of defects.

As shown best in FIG. 4, the novel slab shape achieved by the present invention comprises a rounded or contoured lowermost or bottom section 72 and top section 74. Thus, the novel shape of slab L of the present invention is generally of a cylindrical shape with a generally circular cross-section. It has been found preferable to shape contour pieces 56 and 56a and space conveyors 26 and 28 so as to achieve a slab having approximately the same width w as height h, the length of the slab being of any desired length to facilitate subsequent handling and manufacture.

Thus, there is described novel and improved methods and apparatus for continuously forming a novel plastic foam slab having a generally cylindrical configuration. The novel slab thus formed virtually eliminates all waste and can be readily cut into the thinner, more commercially desired sizes without, as heretofore, substantial loss of slab material.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. A continuous process for the production of cylindrical elements of flexible polyurethane foam having a continuous and uninterrupted, substantially uniform cross section suitable for peeling with a knife to form elongated continuous sheets of said foam; said method comprising the steps of uniformly distributing a flexible polyurethane foam forming, liquid reaction mixture onto a travelling casting surface at a deposit station, solidly supporting the bottom and side regions of the casting surface containing the reaction mixture in a generally cylindrical open top configuration while conveying it longitudinally away from the deposit station toward a release station remote therefrom, and maintaining such support in a generally cylindrical open top configuration during the foam rise period at least until the foam assumes its final integrity and self-sustained shape.

2. A process as in claim 1 wherein the configuration of the casting surface is changed from a generally flat contour to a generally cylindrical contour as the liquid reaction mixture is conveyed away from the deposit station.

3. A process according to claim 1 wherein said reaction mixture is moveably supported by carrying it along on a flexible web and by solidly supporting said web in said supporting configuration.

4. A process according to claim 1 wherein said reaction mixture is moveably supported by causing endless loop conveyor means, having a plurality of closely spaced solid segmented elements forming a cross section corresponding to said supporting configuration, to operate in a manner such that said elements cooperate to form a solid support which moves along away from said deposit station toward said release station.

5. A process according to claim 1 wherein said supporting configuration is maintaained according to a cross-sectional diameter of approximately thirty inches to produce a product suitable for peeling by rotation against a knife blade to produce a thin continuous sheet.

6. A process according to claim 1 wherein said reaction mixture is moveably supported by causing a pair of endless loop conveyors to operate in side-by-side relationship in the region between said deposit and release stations while carrying on said conveyors solid support segments which cooperate to define a solid moving support channel between said deposit and release stations.

7. A process according to claim 1 wherein said liquid reaction mixture is caused to pass over a weir-like obstruction in the vicinity of said deposit station.

8. A process according to claim 1 wherein said reaction mixture is caused to follow a slight downward inclination between said deposit and release stations.

9. A process according to claim 2 wherein said liquid reaction mixture is caused to pass over a weir-like obstruction prior to said configuration change.

References Cited

UNITED STATES PATENTS

| | | |
|---|---|---|
| 775,540 | 11/1904 | McConnell. |
| 2,200,262 | 5/1940 | Daley et al. _____ 264—47 |
| 2,549,864 | 4/1951 | Toulmin. |
| 2,835,924 | 5/1958 | Schmeling _____ 264—47 |
| 2,898,626 | 8/1959 | Alderfer et al. |
| 3,079,641 | 3/1963 | Knox et al. _____ 264—54 |
| 3,123,856 | 3/1964 | Dye et al. _____ 264—47 |
| 3,152,361 | 10/1964 | Edwards _____ 264—54 XR |
| 3,249,486 | 5/1966 | Voisinet et al. ___ 264—54 XR |
| 3,325,573 | 6/1967 | Boon et al. _____ 264—54 |
| 3,281,894 | 11/1966 | Buff et al. |
| 3,296,658 | 1/1967 | Buff et al. |

OTHER REFERENCES

M–H Standard Bulletin, "Armorbelt Moving Tunnel for Continuous Production of Rigid Urethane Foam," M–H Standard Corp., Hamilton, Ohio (received Nov. 29, 1963), pp. 1–2.

PHILIP E. ANDERSON, Primary Examiner

U.S. Cl. X.R.

264—300, 158